US009495815B2

(12) United States Patent
Fitzgibbon

(10) Patent No.: US 9,495,815 B2
(45) **Date of Patent: *Nov. 15, 2016**

(54) SYSTEM INTERACTION WITH A MOVABLE BARRIER OPERATOR METHOD AND APPARATUS

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/971,374

(22) Filed: Dec. 17, 2010

(65) Prior Publication Data

US 2011/0084798 A1 Apr. 14, 2011

Related U.S. Application Data

(63) Continuation of application No. 12/341,658, filed on Dec. 22, 2008, now Pat. No. 7,876,218, and a continuation of application No. 11/044,928, filed on Jan. 27, 2005, now Pat. No. 7,482,923.

(51) Int. Cl.

| | |
|---|---|
| ***H04Q 9/00*** | (2006.01) |
| ***G08B 1/08*** | (2006.01) |
| ***G08B 13/00*** | (2006.01) |
| ***G07C 9/00*** | (2006.01) |
| ***G08B 13/22*** | (2006.01) |
| ***E05F 15/70*** | (2015.01) |

(52) U.S. Cl.

CPC ........... *G07C 9/00007* (2013.01); *E05F 15/70* (2015.01); *G08B 13/22* (2013.01)

(58) Field of Classification Search

None

See application file for complete search history.

(56) References Cited

U.S. PATENT DOCUMENTS

| | | | | |
|---|---|---|---|---|
| 6,850 | A | 11/1849 | Pone | |
| 2,980,827 | A | 4/1961 | Hill | |
| 3,536,836 | A | 10/1970 | Pfeiffer | |
| 4,325,146 | A | 4/1982 | Lennington | |
| 4,360,801 | A | 11/1982 | Duhame | |
| 4,408,251 | A * | 10/1983 | Kaplan | 361/172 |
| 4,464,651 | A | 8/1984 | Duhame | |
| 4,533,905 | A | 8/1985 | Leivenzon | |
| 4,573,046 | A | 2/1986 | Pinnow | |
| 4,583,081 | A | 4/1986 | Schmitz | |
| 4,629,874 | A | 12/1986 | Pugsley | |
| 4,821,024 | A | 4/1989 | Bayha | |
| 4,881,148 | A | 11/1989 | Lambropoulos | |

(Continued)

FOREIGN PATENT DOCUMENTS

| | | |
|---|---|---|
| DE | 19801119 C1 | 9/1999 |
| EP | 0422190 | 10/1990 |

(Continued)

OTHER PUBLICATIONS www.brinkshomesecurity.com/home-security-systems-and-pricing/security-equipment/security-equipment.htm as printed on Feb. 11, 2009.

(Continued)

*Primary Examiner* — Julie Lieu

(74) *Attorney, Agent, or Firm* — Fitch Even Tabin & Flannery LLP

(57) ABSTRACT

A secure communication link (24) is provided between a movable barrier operator (23) and a peripheral system (20). Information conveyed via this link is used by one, the other, or both such elements to further inform or direct their respective actions.

38 Claims, 1 Drawing Sheet

(56) References Cited

U.S. PATENT DOCUMENTS 4,922,224 A * 5/1990 Drori et al. .................. 340/428
4,987,402 A 1/1991 Nykerk
5,003,293 A 3/1991 Wu
5,047,928 A 9/1991 Wiedemer
5,155,680 A 10/1992 Wiedemer
5,191,268 A 3/1993 Duhame
5,247,440 A 9/1993 Capurka
5,255,341 A 10/1993 Nakajima
5,278,832 A 1/1994 Binzel
5,280,527 A 1/1994 Gullman
5,283,549 A 2/1994 Mehaffey
5,402,105 A 3/1995 Doyle
5,444,440 A * 8/1995 Heydendahl ............ E05B 47/00 340/5.3
5,473,318 A 12/1995 Martel
5,475,377 A 12/1995 Lee
5,541,585 A 7/1996 Duhame
5,565,843 A 10/1996 Meyvis
5,565,857 A 10/1996 Lee
5,596,840 A 1/1997 Teich
5,608,778 A 3/1997 Partridge, III
5,656,900 A 8/1997 Michel
5,689,236 A 11/1997 Kister
5,731,756 A 3/1998 Roddy
5,780,987 A 7/1998 Fitzgibbon
5,781,107 A 7/1998 Ji
5,805,064 A 9/1998 Yorkey
5,805,082 A 9/1998 Hassett
5,883,579 A 3/1999 Schreiner
5,886,634 A 3/1999 Muhme
5,917,405 A 6/1999 Joao
5,940,000 A 8/1999 Dykema
5,969,637 A 10/1999 Doppelt
5,990,828 A 11/1999 King
6,002,332 A 12/1999 King
6,011,468 A 1/2000 Lee
6,026,165 A 2/2000 Marino
6,028,537 A 2/2000 Suman
6,070,361 A 6/2000 Paterno
6,127,740 A * 10/2000 Roddy et al. ................ 307/10.1
6,131,019 A * 10/2000 King ............................... 455/99
6,154,544 A 11/2000 Farris
6,161,005 A 12/2000 Pinzon
6,166,634 A 12/2000 Dean
6,184,641 B1 2/2001 Crimmins
6,192,282 B1 2/2001 Smith
6,223,029 B1 * 4/2001 Stenman et al. .............. 455/420
6,225,903 B1 5/2001 Soloway
6,266,540 B1 7/2001 Edgar, III
6,271,765 B1 8/2001 King
6,278,249 B1 8/2001 Fitzgibbon
6,310,548 B1 10/2001 Stephens, Jr.
6,326,754 B1 12/2001 Mullet
6,346,889 B1 * 2/2002 Moss ......................... 340/686.1
6,356,868 B1 3/2002 Yuschik
6,388,559 B1 5/2002 Cohen
6,400,265 B1 6/2002 Saylor
6,404,337 B1 6/2002 Van
RE37,784 E 7/2002 Fitzgibbon
6,427,913 B1 8/2002 Maloney
6,434,158 B1 8/2002 Harris
6,434,408 B1 8/2002 Heckel
6,448,894 B1 9/2002 Desai
6,476,708 B1 11/2002 Johnson
6,476,732 B1 11/2002 Stephan
6,484,784 B1 11/2002 Weik, III
6,525,645 B2 2/2003 King
6,553,238 B1 4/2003 Ginzel
6,553,881 B2 4/2003 Marmin
6,561,255 B1 5/2003 Mullet
6,563,430 B1 5/2003 Kemink
6,564,056 B1 5/2003 Fitzgerald
6,597,291 B2 7/2003 Tsui
6,616,034 B2 9/2003 Wu
6,634,408 B2 10/2003 Mays
6,661,340 B1 12/2003 Saylor
6,686,838 B1 2/2004 Rezvani
6,717,528 B1 4/2004 Burleson
6,781,516 B2 8/2004 Reynard et al.
6,782,662 B2 8/2004 McCartney
6,792,083 B2 9/2004 Dams
6,803,851 B1 10/2004 Kramer
6,803,882 B2 10/2004 Hoetzel
6,812,849 B1 11/2004 Ancel
6,822,603 B1 11/2004 Crimmins
6,823,188 B1 11/2004 Stern
6,833,681 B2 12/2004 Fitzgibbon
6,850,163 B1 2/2005 Adamczyk
6,891,838 B1 5/2005 Petite
6,903,650 B2 6/2005 Murray
6,919,790 B2 7/2005 Kanazawa
6,924,727 B2 8/2005 Nagaoka
6,933,843 B1 * 8/2005 Hom et al. ................. 340/545.1
6,960,998 B2 11/2005 Menard
6,975,202 B1 12/2005 Rodriguez
6,975,226 B2 12/2005 Reynard et al.
6,980,117 B1 12/2005 Kirkland
6,980,131 B1 12/2005 Taylor
6,989,760 B2 1/2006 Dierking
6,998,977 B2 2/2006 Gregori
7,038,409 B1 5/2006 Mullet
7,057,494 B2 6/2006 Fitzgibbon
7,071,813 B2 7/2006 Fitzgibbon
7,071,850 B1 * 7/2006 Fitzgibbon et al. ............ 341/57
7,091,688 B2 8/2006 Gioia
7,124,943 B2 10/2006 Quan
7,127,847 B2 10/2006 Fitzgibbon
7,142,849 B2 11/2006 Neuman
7,158,007 B2 1/2007 Kawamoto
7,161,319 B2 1/2007 Ergun
7,161,466 B2 1/2007 Chuey
7,167,076 B2 1/2007 Wilson
7,170,998 B2 1/2007 McLintock
7,190,266 B2 3/2007 Mullet
7,197,278 B2 3/2007 Harwood
7,205,908 B2 4/2007 Tsui
7,207,142 B2 4/2007 Mullet
7,221,289 B2 5/2007 Horn
7,262,683 B2 8/2007 Maeda
7,266,344 B2 9/2007 Rodriguez
7,269,416 B2 9/2007 Guthrie
7,274,300 B2 9/2007 Duvernell et al.
7,289,014 B2 10/2007 Mullet
7,298,240 B2 11/2007 Lamar
7,306,145 B2 12/2007 Sakai
7,310,043 B2 12/2007 Mamaloukas
7,323,991 B1 1/2008 Eckert
7,331,144 B2 2/2008 Parsadayan
7,332,999 B2 2/2008 Fitzgibbon
7,365,634 B2 4/2008 Brookbank
7,370,074 B2 5/2008 Alexander et al.
7,380,375 B2 6/2008 Maly
7,392,944 B2 7/2008 Sheih
7,424,733 B2 9/2008 Kamiwada
7,446,644 B2 11/2008 Schaffzin
7,464,403 B2 12/2008 Hardman, Jr.
7,468,676 B2 12/2008 Styers
7,471,199 B2 12/2008 Zimmerman
7,482,923 B2 1/2009 Fitzgibbon
7,493,726 B2 2/2009 Fitzgibbon
7,498,936 B2 3/2009 Maeng
7,532,965 B2 5/2009 Robillard
7,561,075 B2 * 7/2009 Fitzgibbon et al. ............ 341/57
7,600,550 B2 10/2009 Mays
7,616,090 B2 11/2009 Baker
7,708,048 B2 5/2010 Mays
7,724,687 B2 5/2010 Autret
7,741,951 B2 6/2010 Fitzgibbon
7,750,890 B2 7/2010 Fitzgibbon
7,761,186 B2 7/2010 Keller
7,778,604 B2 8/2010 Bauman et al.
7,783,018 B1 8/2010 Goldberg
7,852,212 B2 12/2010 Fitzgibbon
7,853,221 B2 12/2010 Rodriguez

(56) References Cited

U.S. PATENT DOCUMENTS 7,856,558 B2 12/2010 Martin
7,876,218 B2 1/2011 Fitzgibbon
7,983,180 B2 7/2011 Harrington
7,994,896 B2 8/2011 Fitzgibbon
7,995,460 B2 8/2011 Edgar, III
8,014,528 B2 9/2011 Bunte
8,040,217 B2 10/2011 Fitzgibbon
8,063,592 B2 11/2011 Shier
8,144,011 B2 3/2012 Fitzgibbon
8,175,591 B2 5/2012 Fitzgibbon
8,207,818 B2 6/2012 Keller, Jr.
8,239,481 B2 8/2012 Alexander et al.
8,290,515 B2 10/2012 Staton
8,368,509 B2 2/2013 Fitzgibbon
8,416,054 B2 4/2013 Fitzgibbon
8,421,591 B2 4/2013 Karasek
8,423,788 B2 4/2013 Holtzman
8,544,523 B2 10/2013 Mays
8,577,392 B1 11/2013 Pai
8,587,404 B2 11/2013 Laird
8,868,220 B2 10/2014 Crucs
2001/0011941 A1* 8/2001 King et al. .................. 340/5.64
2001/0017483 A1 8/2001 Frohberg
2002/0014954 A1 2/2002 Fitzgibbon
2002/0033760 A1 3/2002 Kobayashi
2002/0067308 A1 6/2002 Robertson
2002/0162175 A1 11/2002 Berglund
2002/0178385 A1 11/2002 Dent
2002/0180582 A1 12/2002 Nielsen
2002/0180600 A1 12/2002 Kirkland
2002/0183008 A1 12/2002 Menard
2003/0016119 A1 1/2003 Teich
2003/0016139 A1 1/2003 Teich
2003/0018478 A1 1/2003 Mays
2003/0023881 A1 1/2003 Fitzgibbon
2003/0029579 A1 2/2003 Mays
2003/0043021 A1 3/2003 Chung
2003/0097586 A1 5/2003 Mok
2003/0098778 A1 5/2003 Taylor
2003/0118187 A1 6/2003 Fitzgibbon
2003/0151493 A1 8/2003 Straumann
2003/0182132 A1 9/2003 Niemoeller
2003/0193388 A1 10/2003 Ghabra
2003/0216139 A1* 11/2003 Olson et al. .................. 455/419
2003/0222754 A1 12/2003 Cho
2004/0012481 A1 1/2004 Brusseaux
2004/0012483 A1 1/2004 Mays
2004/0036573 A1 2/2004 Fitzgibbon
2004/0176107 A1 9/2004 Chadha
2004/0212498 A1 10/2004 Peterson
2004/0239482 A1 12/2004 Fitzgibbon
2004/0257189 A1 12/2004 Chang
2004/0257199 A1 12/2004 Fitzgibbon
2005/0012631 A1* 1/2005 Gregori et al. ............ 340/686.1
2005/0030179 A1 2/2005 Script
2005/0033641 A1 2/2005 Jha
2005/0035873 A1 2/2005 Kimura
2005/0044906 A1 3/2005 Spielman
2005/0076242 A1* 4/2005 Breuer .......................... 713/201
2005/0085248 A1 4/2005 Bailey
2005/0088281 A1 4/2005 Rohrberg
2005/0099299 A1 5/2005 Tyroler
2005/0110639 A1 5/2005 Puzio
2005/0113080 A1* 5/2005 Nishimura .................... 455/420
2005/0134426 A1 6/2005 Mullet et al.
2005/0146417 A1 7/2005 Sweatte
2005/0170777 A1* 8/2005 Harwood et al. ............ 455/41.2
2005/0174250 A1* 8/2005 Dierking et al. .......... 340/686.1
2005/0195066 A1 9/2005 Vandrunen
2005/0206497 A1 9/2005 Tsui
2005/0242923 A1 11/2005 Pearson
2005/0245233 A1 11/2005 Anderson
2005/0258937 A1 11/2005 Neuwirth
2005/0272372 A1 12/2005 Rodriguez
2005/0273372 A1 12/2005 Bowne
2006/0038656 A1 2/2006 Wilson
2006/0056663 A1 3/2006 Call
2006/0077035 A1 4/2006 Mamaloukas
2006/0091998 A1 5/2006 Fitzgibbon
2006/0103503 A1* 5/2006 Rodriguez ......... G05B 19/0428
340/5.71
2006/0132284 A1* 6/2006 Murphy et al. ................ 340/5.7
2006/0137261 A1* 6/2006 Maly ............................. 52/36.3
2006/0145811 A1 7/2006 Nantz
2006/0147052 A1 7/2006 Wikel
2006/0153122 A1 7/2006 Hinman
2006/0158344 A1* 7/2006 Bambini et al. ......... 340/825.69
2006/0164208 A1 7/2006 Schaffzin
2006/0187034 A1 8/2006 Styers
2006/0214783 A1 9/2006 Ratnakar
2006/0220785 A1 10/2006 Ferdman
2006/0223518 A1 10/2006 Haney
2006/0261932 A1* 11/2006 Ando et al. .............. 340/426.14
2006/0279399 A1 12/2006 Chuey
2006/0281008 A1 12/2006 Mitani
2007/0005605 A1 1/2007 Hampton
2007/0005806 A1 1/2007 Fitzgibbon
2007/0028339 A1 2/2007 Carlson
2007/0046428 A1 3/2007 Mamaloukas
2007/0058811 A1* 3/2007 Fitzgibbon et al. .......... 380/268
2007/0116194 A1 5/2007 Agapi
2007/0146118 A1 6/2007 Rodriguez
2007/0159301 A1 7/2007 Hirt
2007/0171046 A1 7/2007 Diem
2007/0177740 A1 8/2007 Nakajima
2007/0183597 A1 8/2007 Bellwood et al.
2007/0185597 A1 8/2007 Bejean et al.
2007/0290792 A1 12/2007 Tsuchimochi
2008/0092443 A1 4/2008 Herman
2008/0106370 A1 5/2008 Perez
2008/0132220 A1 6/2008 Fitzgibbon
2008/0224886 A1 9/2008 Rodriguez et al.
2008/0303706 A1 12/2008 Keller
2009/0005080 A1 1/2009 Forstall
2009/0063293 A1 3/2009 Mirrashidi
2009/0064056 A1 3/2009 Anderson
2009/0102651 A1 4/2009 Fitzgibbon
2009/0160637 A1 6/2009 Maeng
2009/0273438 A1 11/2009 Sultan
2009/0315751 A1 12/2009 Bennie
2010/0120450 A1 5/2010 Herz
2010/0141381 A1 6/2010 Bliding
2010/0141514 A1 6/2010 Bell
2010/0242360 A1 9/2010 Dyas
2010/0242369 A1 9/2010 Laird
2010/0289661 A1 11/2010 Styers
2010/0297941 A1 11/2010 Doan
2010/0299517 A1 11/2010 Jukic et al.
2011/0025456 A1 2/2011 Bos
2011/0032073 A1 2/2011 Mullet
2011/0084798 A1 4/2011 Fitzgibbon
2011/0130134 A1 6/2011 VanRysselberghe
2011/0193700 A1 8/2011 Fitzgibbon
2011/0205013 A1 8/2011 Karasek
2011/0234367 A1* 9/2011 Murphy ............... G05B 19/042
340/3.7
2011/0254685 A1 10/2011 Karasek
2011/0258076 A1 10/2011 Muirbrook
2011/0316667 A1 12/2011 Tran
2012/0098638 A1 4/2012 Crawford
2012/0188054 A1 7/2012 Bongard
2012/0249289 A1 10/2012 Freese
2012/0280783 A1 11/2012 Gerhardt
2012/0280789 A1 11/2012 Gerhardt
2012/0280790 A1 11/2012 Gerhardt
2013/0057695 A1 3/2013 Huisking
2013/0093563 A1 4/2013 Adolfsson
2013/0147600 A1 6/2013 Murray
2013/0151977 A1 6/2013 Arteaga-King
2013/0257589 A1 10/2013 Mohiuddin
2014/0184393 A1 7/2014 Witkowski
2014/0253285 A1 9/2014 Menzel

(56) References Cited

U.S. PATENT DOCUMENTS

| | | | |
|---|---|---|---|
| 2014/0266573 | A1 | 9/2014 | Sullivan |
| 2015/0221147 | A1 | 8/2015 | Daniel-Wayman |
| 2016/0010382 | A1 | 1/2016 | Cate |

FOREIGN PATENT DOCUMENTS

| | | | |
|---|---|---|---|
| EP | 846991 | | 6/1998 |
| EP | 0913979 | A2 | 5/1999 |
| EP | 1151598 | | 6/2000 |
| EP | 1 227 027 | A2 * | 7/2002 |
| GB | 2404765 | | 2/2005 |
| JP | 2002019548 | | 1/2002 |
| JP | 2004088774 | | 3/2004 |
| JP | 4864457 | | 2/2012 |
| KR | 2002032461 | | 5/2002 |
| WO | 9012411 | | 10/1990 |
| WO | 9515663 | A1 | 6/1995 |
| WO | 9923614 | | 5/1999 |
| WO | 0036812 | | 6/2000 |
| WO | WO0193220 | | 12/2001 |
| WO | 2002075542 | | 9/2002 |
| WO | 2009088901 | | 7/2009 |
| WO | 2011055128 | | 5/2011 |

OTHER PUBLICATIONS

Combined Search and Examination Report Cited in British Patent Application No. GB1025649.5 Dated Aug. 8, 2012.
Bill Peisel; "Designing the Next Step in Internet Applicances" Electronic Design/ Mar. 23, 1998.
Examination Report Dated Apr. 3, 2012 issuing from New Zealand Patent Application No. 599055.
George Lawton; "Dawn of the Internet Appliance" Computer, Industry Trends; Oct. 1, 1997.
Ian Bryant and Bill Rose; "Home Systems: Home Controls;" p. 1-322; © 2001 Parks Associates.
K.K. Tan, Y.L. Lim and H.L. Goh; "Remote Adaptive Control and Monitoring" IEEE (c) 2002.
Kurt Scherf, Michael Greeson and Tricia Parks; "Primary Perspectives: "EEnabled" Home Security;" pp. 1-87; © 2003 Parks Associates.
Peter M. Corcoran and Joe Desbonnet; "Browser-Style Interfaces to a Home Automation Network" Manuscript received Jun. 18, 1997, IEEE (c) 1997.
Summary of Findings From Parks Associates\ Early Reports; pp. 9-13; Apr. 15, 2013 by Parks Associates.
4Sight Internet Brochure; http://4sightsolution.4frontes.com/document/4CB-4S00-0809; Carrollton, TX; 2009; 5 pgs.
828LM—LiftMaster Internet Gateway; http://www.liftmastercom/consumerweb/pages/accessoriesmodeldetaiLaspx?modelId=2407; printed Oct. 30, 2012.
ActieHome PC Home Automation System; http://www.x10.com/promotions/sw31a_activehome_hmp.html?WENTY11; accessed Sep. 2011.
Arrayent; White Paper: Six System Requirements for an Internet-Connected Product Line; Copyright 2010; http://arrayent.com/pdfs/SixSystemRequirementsforInternetConnectedProductsLine.pdf.
Automatic Garage Door Closer Manual—Protectrix 18A—Dated Mar. 31, 2009.
Examination Report from New Zealand Patent Application No. 599055 dated Apr. 3, 2012.
EZSrve-Insteon/X10 Home Automation Gateway—Model #5010L; hap:// www.simplehomenet.com/proddetail.asp?prod+9357342317, accessed Sep. 2011.
Fully-Loaded ActiveHome Pro PC Hom Automation System; http://www.x10.com/promotions/cm15a_loaded_ps.html; accessed Sep. 2011.
Press Release; Kenmore Uneils Reolutionary Technology Enabling Laundry Applicances to 'Talk' to Customer Serice Experts; PR Newswire, pNA, Aug. 4, 2010.
Protectrix Wireless automatic Garage Door Closer Timer Opener Security Accessory; http://www.closethegarage.com; printed Oct. 30, 2012.
Somfy's Slick Tahoma Z-Wire and RTS Home Automatation Gateway; Thomas Ricker; posted Janaury 4, 2011; http://www.engadget.com/2011/01/04/softys-tahoma-z-wave-and-rts-home-automation-gateway/.
Stephen Shankland; "Need to lend your key? E-Mail it, Frauhofer says" news.cnet.com/8301-1035_3-57572338-94/need-to-lend-your-key-e-mail-it-fraunhofer-says/; pp. 1-5; CNET News, Mar. 4, 2013.
The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.
The Intelli-M eIDC32; True IP Access Control; htto://www.infinias.com/main/Products/eIDCController.aspx; Known and printed as early as Dec. 19, 2011.
ULStandard for Safety for Door, Drapery, Gate, Louver, and Window Operators and Systems, UL 325 Fifth Edition, Dated Jun. 7, 2002; pp. 1-186.
Universal Devices—ISY-99i Series; http://www.universal-devices.com/99i.htm; Accessed Sep. 2011.
Wayne-Dalton Press Area—New Z-Wave enabled prodrive; http://www.wayne-dalton.com/newsitem98.asp; Printed Oct. 13, 2011.
Xanboo XPC280 Wireless Universal Garage Door Control—Smarthome; http://www.smarthome.comf75066/Xanboo-XPC280-Wireless-Universal-Garage-DoorControl/p.aspx, printed Oct. 30, 2012.
"Now You Can Close Your Garage Door With a Smartphone;" Copyright 2011 USA Today; http://content.usatoday.com/communities/driveon/post/2011/09/now-you-can-control-your-garage-door-from-your-smartphone.
828LM—LiftMaster Internet Gateway; http://www.liftmastercom/consumerweb/pages/accessoriesmodeldetaiLaspx? modelId=2407; printed Oct. 30, 2012.
Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.
HomeRemote Wireless Home Automation Gateway—PracticallyNetworked.com; Review date Aug. 2007; http://222.practicallynetworked.com/review.asp?pid=690; Accessed Sep. 2011.
HomeSeer HS2—Home Automation Software; http://store.homeseer.com/store/HomeSeer-HS2-Home-Automation-Software-Download-P103.aspx; Accessed Sep. 2011.
How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.
Infinias Mobile Credential App for Android DroidMill; Known and printed as early as Dec. 19, 2011; http://droidmill.com/infinias-mobile-credential-1364120.html.
Intelli-M eIDC32; Ethernet-Enabled Integrated Door Controller; www.infinias.com; Known and printed as early as Dec. 19, 2011.
Internet Connected Garage Door Opener; Open New Doors at Sears; http:// www.sears.corri/shc/s/p_10153_12605_00930437000P?prdNo=l&blockNo=1&blockType=G1; printed Oct. 30, 2012.
Kenmore Connect; http:/www.kenmore.com/shc/s/dap_10154_12604_DAP_Kenmore+Connect; 2010 Sears Brands, LLC.

(56) References Cited

OTHER PUBLICATIONS

LiftMaster; MyQ Enabled Accessory: LiftMaster Internet Gateway (Model 828); Known as of Dec. 19, 2011.
Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_Final.pdf.
LiftMaster Internet Gateway: Your Simple Solution to Home Control; http://www.liftmaster.com/consumerweb/products/IntroducingLiftMasterInternetGateway, printed Oct. 30, 2012.
MiCasa Verde.com—Vers2; http://www.micasaverde.com/vera.php; Accessed Sep. 2011.
Miele's Remote Vision Explained; http://www.miclensa.com/service/remote_vision/verify.aspx; Accessed Feb. 2012.
The Craftsman Brant Announces Garage Door Opener of the Future—PR Newswire; The Sacramento Bee; http://www.sac.bee.com/2011/09/27/2941742/the-craftsman-brand-announces.html; Sep. 27, 2011.
The Intelli-M eIDC32; True IP Access Control; htto://www.infinias.com/main/ Products/eIDCController.aspx; Known and printed as early as Dec. 19, 2011.
Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.
Canadian Patent Application No. 2,533,795; Second Office Action Dated Dec. 30, 2013.
Examination Report Under Section 18(3) for GB1205649.5 Dated Feb. 12, 2014.
Examination Report Under Section 18(3) Cited in British Patent Application No. GB1205649.5 Dated May 29, 2013.
"Now You Can Close Your Garage Door With a Smartphone," Copyright 2011 USA Today; http://content.usatoday.com/communities/driveon/post/2011/09/now-you-can-control-your-garage-door-from-your-smartphone.
Susan Cotterell, Frank Vahid, Walid Najar, and Harry Hsieh; "First Results with eBlocks: Embedded Systems Building Blocks" University of California, Riverside pp. 168-175; Codes+ISSS'03, Oct. 1-3, 2003.
Hassan A. Artail; A Distributed System of Network-Enabled Microcontrollers for Controlling and Monitoring Home Devices: IEEE 2002, pp. 206-209.
U.S. Office Action Dated Sep. 24, 2014 in U.S. Appl. No. 13/921,584.
Canadian Patent Application No. 2,533,795; Office Action Dated Jan. 9, 2015.
4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.
6POWER, IPv6 and PLC for home automation; Terena 2004; Jordi Palet & Francisco Ortiz.
Authentication vs. Encryption; Be in Control with Control Networks; Feb. 10, 2004; http:// www.buildings.com/DesktcpModulesIBB ArlicleMaxfArticleDeta I/BBArticleDetai I Printaspx7ArlicleID=1740& Template=standm-d_Pri nt.ascx &siteID= 1.
Big blue builds home network technology; McCune, Heather; http://search.proquest.com/docview/194229104?accountid=12492; Apr 2003.
Controlling the Status Indicator Module of the Stanley Garage Door Opener Set; Rene Braeckman; Apr. 6, 2000.
Detroit Free Press Home Computing Column; Detroit Free; Newman, Heather; http ://search.proquest.com/docview/4632707 4 7?accountid=12492; Knight Ridder/Tribune Business News; ©2002, last updated Dec. 13, 2011.
Diomidis D. Spinellis; The information furnace: consolidated home control; Accepted: Aug. 14, 2002; © Springer-Verlag London Limited 2003.
Doug Olenick; Motorola Broadens Home Automation Line; http :// search.proquest.com/docview/232255560?accountid=12492; vol. 20, © Jan. 6, 2005; last updated Sep. 1, 2011.
International Conference on Sensors and Control Techniques (leSC 2000); Desheng Jiang, Anbo Wang, Fume and Temperature Alarm and Intelligent Control System of the District for Fire-Proof, Jun. 19-21, 2000, Wuhan, China, vol. 4077.
Net2 User Manual; Version 3; Paxton Access; "Date code: 281002".
Secure Smart Homes using• Jini and UIUC Sesame; Jalal Al-Muhtadi et al.; 1063-9527/00 © 2000 IEEE.
Security System Installation Manual; Caretaker and Custom Versions; Interactive Technologies, Inc.; Issue Date May 5, 1994.
Security System Installation Manual; Caretaker and Custom Versions; Interactive Technologies, Inc.; Text No. 46-908-01 Rev. A; 1995.
Smart Networks for Control; Reza S. Raji;IEEE Spectrum Jun. 1994.
Svein Anders Tunheim; Wireless Home Automation Systems Require Low Cost and Low Power RF-IC Solutions; Wireless Home Automation Systems (rev. 1.0) May 16, 2002; p. 1 of 8.
The iDorm—a Practical Deployment of Grid Technology; Anthony Pounds-Cornish, Arran Holmes; Intelligent Interactive Environments Group, University of Essex, UK; Proceedings of the 2nd IEEE/ACM International Symposium on Cluster Computing and the Grid (CCGRIO'02) 0/7695-1582-7/02 © 2002 IEEE.
The Information Furnace: Consolidated Home Control; Diomidis D. SpinellisDepartment Management Science and Technology Athens University of Economics and Business; Personal and Ubiquitous Computing archive; vol. 7 Issue 1, May 2003.
The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.
Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.
Xanboo Future Product; http://www.xanboo.com/xanproducts/newproducts.htm Feb. 2002, Xanboo Inc.
XPress Access; Simple Personal Management; © 2001 Andover Controls Corporation BR-XPACCESS-A.
Defendant's Motion to Dismiss Second Amended Complaint Due to Patent Invalidity Under 35 U.S.C. § 101; NDIL Case 14-cv-05197; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit A; U.S. Pat. No. 6,998,977; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit B; U.S. Pat. No. 7,852,212; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit C; U.S. Pat. No. 8,144,011; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit D; U.S. Pat. No. 7,876,218; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit E; U.S. Pat. No. 7,482,923; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit F; U.S. Pat. No. 7,071,850; Mar. 17, 2015.

(56) References Cited

OTHER PUBLICATIONS

Memorandum in Support of Defendant\s Motion to Dismiss Second Amended Complaint Due to Patent Invalidity Under 35 U.S.C. § 101; NDIL Case 14-cv-05197; Exhibit G; Dictionary of Computer and Internet Terms; Douglas Downing; Michael A. Covington and Melody Mauidin Covington; Barrons; Mar. 17, 2015.

Memorandum in Support of Defendant\s Motion to Dismiss Second Amended Complaint Due to Patent Invalidity Under 35 U.S.C. § 101; NDIL Case 14-cv-05197; Mar. 17, 2015.

*Wireless Media Innovations LLC* v. *Maherterminals LLC* (2015 WL 1810378 (D.N.J.) Apr. 20, 2015) Submitted as Document #60 in *Chamberlain* vs. *Linear LLC and Nortek Security & Control LLC*; Case No. 1:14-cv-05197, 11 Pages; Apr. 29, 2015.

Nortek Security & Control LLC's Notice of Supplemental Authority Relevant to Defendant's Motion to Dismiss Second Amended Complaint Due to Patent Invalidity Under 35 U.S.C. § 101; *Chamberlain* vs. *Linear LLC and Nortek Security & Control LLC*; Case No. 1:14-cv-05197; 3 pages, Dated Apr. 29, 2015.

Opposition to Defendant's Motion to Dismiss Second Amended Complaint Due to Alleged Patent Invalidity Under 35 U.S.C. 101; *Chamberlain* vs. *Linear LLC and Nortek Security & Control LLC*; Case No. 1:14-cv-05197; 28 pages; Dated Apr. 7, 2015.

Plaintiff Chamberlain Group, Inc.'s Response to Defendant Nortek Security Control LLC's Notice of Supplemental Authority Relevant to Defendant's Motion to Disucss Second Amended Complaint Due to [Alleged] Patent Invalidity Under 35 U.S.C. § 101; *Chamberlain* vs. *Linear LLC and Nortek Security & Control LLC*; Case No. 1:14-cv-05197; 10 Pages; Dated May 12, 2015.

Reply in Support of Defendant's Motion to Dismiss Second Amended Complaint due to Patent Invalidity Under 35 U.S.C. § 101; *Chamberlain* vs. *Linear LLC and Nortek Security & Control LLC*; Case No. 1:14-cv-05197; 21 Pages; Dated Apr. 21, 2015.

British Combined Search and Examination Report Under Section 17 and 18(3) from British Application No. GB0713690.6 Dated Oct. 17, 2007.

British Search Report Under Section 17 Dated Dec. 20, 2007 for Application No. GB07713690.6.

European Patent Application No. EP 1 280 109 A3; European Search Report Dated: Aug. 1, 2005.

International Search Report and Written Opinion for PCT/US2014/057405 Dated Dec. 17, 2014.

James Y. Wilson and Jason A. Kronz; Inside Bluetooth Part II, Dr. Dobb's Portal; The World of Software Development; Dr. Dobb's Journal; Jul. 22, 2001; 9 pages.

Sensory, Inc. RSC-300/364 Data Book, Jan. 2001 (55 pages).

Office Action dated Aug. 27, 2014 from U.S. Appl. No. 13/921,584.

Defendant Invalidity Contentions regarding U.S. Pat. No. 6,998,977, Exhibit 16, Apr. 20, 2015.

Defendant Invalidity Contentions regarding U.S. Pat. No. 7,482,923, Exhibit 20, Apr. 20, 2015.

Defendant Invalidity Contentions regarding U.S. Pat. No. 7,852,212, Exhibit 18, Apr. 20, 2015.

Defendant Invalidity Contentions regarding U.S. Pat. No. 7,876,218, Exhibit 19, Apr. 20, 2015.

Defendant Invalidity Contentions regarding U.S. Pat. No. 8,144,011, Exhibit 17, Apr. 20, 2015.

* cited by examiner

SYSTEM INTERACTION WITH A MOVABLE BARRIER OPERATOR METHOD AND APPARATUS

CROSS REFERENCE TO RELATED APPLICATIONS

This application is a continuation application of U.S. patent application Ser. No. 12/341,658, filed on Dec. 22, 2008, now issued as U.S. Pat. No. 7,876,218, which is a continuation application of U.S. patent application Ser. No. 11/044,928, filed Jan. 27, 2005, now U.S. Pat. No. 7,482,923, each of which is hereby incorporated herein by reference in their entireties. This application is also related to U.S. patent application Ser. No. 12/435,822, filed on May 5, 2009 and U.S. patent application Ser. No. 12/967,505, filed on Dec. 14, 2010.

TECHNICAL FIELD

This invention relates generally to movable barrier operators and more particularly to communications therewith.

BACKGROUND

Movable barrier operators of various kinds are known in the art. Such movable barrier operators often work in conjunction with a corresponding movable barrier such as a single panel or segmented garage door, a rolling shutter, a pivoting, swinging, or sliding gate or arm barrier, and so forth. In particular, the movable barrier operator typically responds to user inputs (often as input via a remotely located user interface) to effect selective movement of a corresponding movable barrier (for example, to transition the movable barrier back and forth between a closed and an opened position). Some movable barrier operators have additional functionality. For example, some movable barrier operators are able to control the illumination state of one or more light sources.

Alarm systems, including but not limited to intrusion detection alarm systems, are also known in the art. Such systems often serve to monitor one or more intrusion detectors and to respond to a detected intrusion with a corresponding action. Exemplary actions include sounding an audible alarm, illuminating or flashing one or more light sources, automatically sourcing a page, telephone call, or the like to notify one or more predetermined parties of the detected intrusion, and so forth.

In many cases, a building or residence having an alarm system will also have one or more movable barrier operators. There have been some prior efforts to effect communications and/or cooperation as between such elements. For example, the X10 standard has been employed to effect relatively simplistic communications (such as indicating a present status of a movable barrier to an alarm system or to permit an alarm system controller to also control activation of a movable barrier operator).

To date, such proposals are relatively simple and do not permit or facilitate much potential depth or capacity with respect to leveragable functionality. As a practical result, for the most part, little integration has occurred in the marketplace. At least one problem posed by seeking more powerful cooperation between such elements relates to increasing the likelihood that an unauthorized individual may be able to take advantage of the necessarily expanded communication link(s) as are used to support such cooperation and thereby impair or defeat the alarm system itself, the movable barrier operator, or both. Another problem reflects an apparent present perception on the part of at least some persons skilled in the art that the possible benefits of supporting such cooperation are relatively negligible in comparison to the perceived costs of implementation and risk to overall security and effectiveness.

BRIEF DESCRIPTION OF THE DRAWINGS

The above needs are at least partially met through provision of the alarm system interaction with a movable barrier operator method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a secure communication link between a movable barrier operator and a peripheral alarm system and then effects at least one communication between these elements using that secure communication link.

The secure communication link can comprise, for example, an encrypted wireless communication link, a non-wireless communication link, or the like. The communication can comprise, for example, data such as, but not limited to, an instruction to the movable barrier operator. Depending upon the needs of a given application, the peripheral alarm system can be responsive to data as is received from the movable barrier operator and/or the movable barrier operator can respond to operational instructions as are sourced by the peripheral alarm system.

Various capabilities and corresponding benefits are readily facilitated by these actions. As an illustrative example, when a given alarm system has a corresponding actuation time delay (to permit, for example, a home owner to vacate their premises prior to the alarm system arming itself), use and/or control of that actuation time delay can be further informed, controlled, or influenced by a present (or recent) operational state of a corresponding movable barrier operator. For example, the actuation time delay may be effectively lengthened (or shortened) as a function, at least in part, of whether the garage door of a home is opened, opening, closed, or closing.

Figure 1:
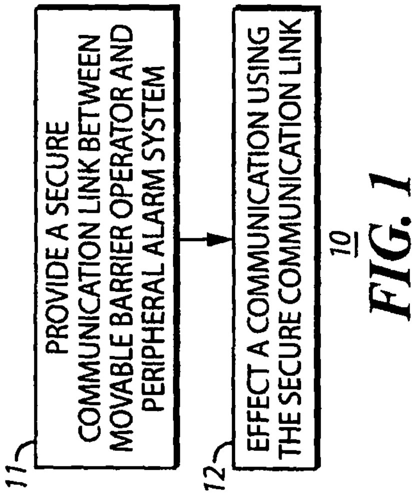
FIG. 1 comprises a flow diagram as configured in accordance with various embodiments of the invention.

These and other benefits may become clearer upon making a thorough review and study of the following detailed description. Referring now to the drawings, and in particular to FIG. 1, these teachings generally encompass a process 10 that provides 11 a secure communication link between a movable barrier operator and a peripheral alarm system. The secure communication link generally comprises a monitoring resistant pathway such as, but not limited to, an encrypted wireless communication link (based, for example, on a radio frequency or light frequency carrier), a non-wireless communication link (such as, for example, an electrical or optical signal conduit) and so forth.

Certain approaches to securing such a communication path are set forth in a co-pending and co-owned patent application bearing Ser. No. 11/044,411, now U.S. Pat. No. 7,071,850, entitled METHOD AND APPARATUS TO FACILITATE TRANSMISSION OF TERNARY MOVABLE BARRIER OPERATOR INFORMATION and as filed on even date herewith, the contents of which are fully incorporated herein by this reference.

Accordingly, by one approach this communication path can comprise a rolling code-based authentication protocol. This rolling code-based authentication protocol, in turn, can employ ternary data. For example, ternary data as corresponds to a communication path endpoint can be converted into a binary format (such as corresponding pairs of binary bits) and then transmitted to a recipient platform. Such a process can achieve an encryption effect.

Depending upon the needs of a given application setting, the secure communication link can comprise a dedicated link as between the movable barrier operator and the peripheral alarm system or can be shared or multiplexed in some manner with other elements. (Those skilled in the art will recognize that additional other communication links, including either or both secure and non-secure communication links, can also be provided as between the movable barrier operator and the peripheral alarm system, if desired.)

This process 10 then generally effects 12 at least one communication as between the movable barrier operator and the peripheral alarm system using the secure communication link. This communication can be directed from the movable barrier operator to the peripheral alarm system and/or vice versa, depending upon the needs and capabilities that characterize a given application setting. Pursuant to a preferred approach this communication comprises, at least in part, data (such as status information as pertains to one or the other of the movable barrier operator and the peripheral alarm system, confirmation messages, instructions, and so forth).

Effecting 12 this communication can also comprise, in a given deployment, effecting an action at one and/or the other of the movable barrier operator and the peripheral alarm system in response to receiving and/or sourcing the at least one communication. For example, the communication itself can comprise an instruction to the movable barrier operator regarding subsequent movement of a movable barrier as is controlled, at least in part, by the movable barrier operator. In such a case, the movable barrier operator may then respond to receipt of this instruction with a compliant action to cause the movable barrier to move as instructed. As another example, the peripheral alarm system may effect a given action as a function, at least in part, of receiving data from the movable barrier operator.

So configured, a movable barrier operator and a peripheral alarm system are able to communicate with one another with respect to information that may be useful to their relative operating strategies and/or with respect to specific instructions that one element can usefully execute to benefit or otherwise match or supplement the operations of the opposing element.

Figure 2:
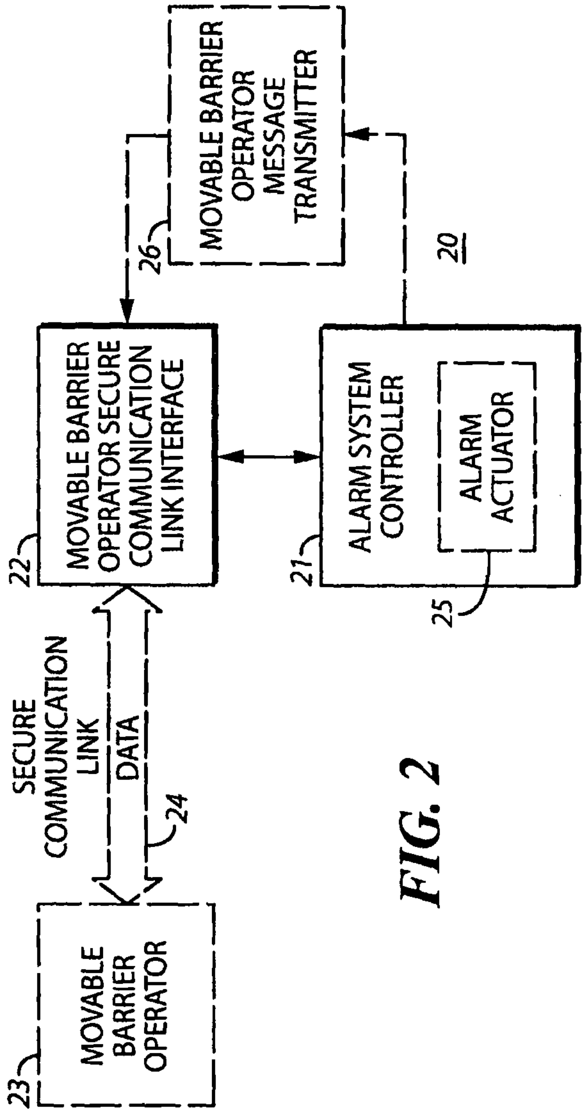
FIG. 2 comprises a block diagram as configured in accordance with various embodiments of the invention.

There are various ways to effect the above-described process 10. An illustrative example will now be set forth with reference to FIG. 2.

In this illustrative embodiment, an alarm control system 20 comprises an alarm system controller 21 that serves to generally receive data (regarding, for example, a monitored premises), to process that data with respect to various rules and tests, and to provide alarms and other actions in accordance with a given operating strategy. Such alarm system controllers 21 are generally well understood in the art. In addition, these teachings are not especially sensitive to the selection or use of any particular alarm system controller. Therefore, further elaboration will not be provided here for the sake of brevity and the preservation of narrative focus aside from noting that such alarm system controllers 21 are often partially or wholly programmable and can therefore be readily programmed to operate as described herein.

In this illustrative embodiment the alarm system controller 21 operably couples to a movable barrier operator secure communication link interface 22. The latter, in turn, comprises the interface that effects compatible interaction with a corresponding movable barrier operator 23 via a given secure communication link 24. So configured, the alarm system controller 21 is able to receive data from the movable barrier operator 23 via the secure communication link 24. As per these teachings, the alarm system controller 21 is then able to respond in some appropriate way to such received data.

In a preferred approach, the alarm system controller 21 comprises, in part, an alarm actuator 25. This alarm actuator 25, in a preferred embodiment, has a corresponding actuation time delay and serves, for example, to delay the arming of the alarm system in order to permit an authorized user to leave their house without fear that an alarm will sound upon detecting the opening of the egress door. In such a case (i.e., when the alarm actuator 25 comprises at least in part an alarm arming actuator), the operation of the alarm actuator 25 can be modified appropriately in response to receipt of information from a corresponding movable barrier operator. For example, arming of the alarm system can be delayed longer than is usual upon being advised by the movable barrier operator that the movable barrier operator's movable barrier (such as a garage door) has been opened but not yet closed (which may indicate, for example, that the authorized user has not yet completely left the premises).

As another example, when the alarm actuator 25 comprises an alarm disarming actuator (to automatically disarm the alarm system when it is otherwise armed), information received from the movable barrier operator can again be used to influence and inform this disarming functionality. To illustrate, when the movable barrier operator receives a remote control signal comprising an instruction to open the movable barrier, this information can be passed to the alarm system controller 21 as per these teachings and then used to trigger a full or temporary disarming of the alarm system in anticipation of the arrival of an authorized user.

Such actions can vary with the needs and requirements of a given application and can also vary with the substantive content of the conveyed information. Similarly, the precise information conveyed can vary with the needs and requirements of a given setting. Some illustrative examples include, but are certainly not limited to:

- reception of a remotely sourced movable barrier operator command signal;

a current position of a movable barrier;
initiation of movement of the movable barrier;
current movement of the movable barrier;
cessation of movement of the movable barrier;
reversal of movement of the movable barrier;
detection of an obstacle in a pathway of the movable barrier; and
unauthorized movement of the movable barrier; to name a few.

As noted above, it may be useful in some settings for the alarm system controller 21 to itself convey information to a movable barrier operator (to permit, for example, providing a specific instruction to the movable barrier operator such as an instruction to illuminate one or more lights, to move the movable barrier to a particular position, to maintain a present position of the movable barrier, and so forth). In such a case a movable barrier operator message transmitter 26 can be provided to effect such transmissions. (Those skilled in the art will recognize and appreciate that such functionality can comprise stand-alone capability (as suggested by the illustration) or can be integrated with other elements of the alarm system such as the alarm system controller 21 and/or the movable barrier operator secure communication link interface 22.)

Figure 3:
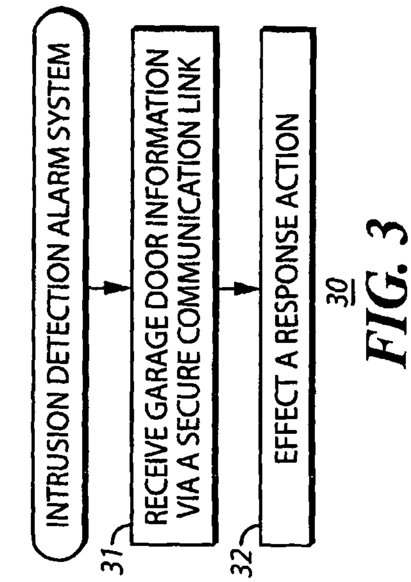
FIG. 3 comprises a flow diagram as configured in accordance with various embodiments of the invention.

Referring now to FIG. 3, and pursuant to a preferred though optional approach, an intrusion detection alarm system is preferably configured and programmed 30 to, upon receiving 31, via a secure communication link, information regarding at least one of an operational status and received operational commands as corresponds to a movable barrier operator (such as, for example, a garage door opener), by automatically effecting 32 at least one responsive action (such as an action that corresponds to at least one of arming and disarming an intrusion detection alarm). As one illustrative example, some movable barrier operators are able to detect an unauthorized opening of a movable barrier (in some cases, such a movable barrier operator is then further configured to oppose that opening movement of the movable barrier by using a motor to drive the movable barrier back to a predetermined position (such as a fully closed position)). Pursuant to these teachings, such a movable barrier operator could also, upon detecting an unauthorized opening of a movable barrier, provide a corresponding signal to a peripheral alarm system. The latter could then, for example, respond by sounding an alarm, illuminating one or more lights, transmitting an automated request for assistance, or the like.

Pursuant to one approach, the effected action can comprise, at least in part, the transmission of an external communication (such as, but not limited to, a command to the garage door opener, an inquiry to the garage door opener, a command to a peripheral alert mechanism, a message (intended, for example, for an authorized or unauthorized user of the movable barrier operator), to name a few).

Pursuant to these teachings, a movable barrier operator and a peripheral alarm system are able to securely communicate with one another. This security, in turn, permits each to rely upon the communications of the other. For example, the peripheral alarm system can rely upon status information from the movable barrier operator and take actions such as disarming its alarm capability with reduced concern that this action may be inappropriate. As another example, the movable barrier operator can rely upon specific operational instructions as may be provided by the peripheral alarm system and take actions that are otherwise contrary to its operating strategy. This, in turn, permits various useful opportunities to leverage the respective capabilities and information sources of both such elements in a way that supplements and benefits one, the other, or both.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method of controlling access to a secured area with a movable barrier operator and a movable barrier, a local secure wireless encrypted communication link between the movable barrier operator and an intrusion detection system peripheral to the movable barrier operator, the movable barrier operator responsive to signals from a remotely located user interface and which movable barrier operator controls movement of the barrier, the intrusion detection system peripheral to the movable barrier operator controlling devices peripheral to the movable barrier operator, the communication link employing a rolling code-based authentication protocol, the method comprising:

effecting at least one wireless signal representative of an encrypted information communication from the movable barrier operator to the intrusion detection system using the local secure wireless encrypted communication link, the at least one wireless signal originating from the movable barrier operator;

performing a control action in response to the intrusion detection system receiving the wireless signal representative of the at least one encrypted information communication from the movable barrier operator; and providing data from the movable barrier operator to the intrusion detection system, wherein the encrypted information comprises, at least in part, status information regarding a positional state of the movable barrier and the at least one wireless signal originating from the movable barrier operator.

2. The method of claim 1 wherein effecting at least one wireless encrypted information communication further comprises:

effecting at least one intrusion detection system action as a function, at least in part, of the data.

3. The method of claim 1 wherein the encrypted information comprises, at least in part, movable barrier operator status information.

4. The method of claim 1 wherein effecting at least one wireless encrypted information communication comprises employing a rolling-code based authentication protocol.

5. An egress control system comprising:

a movable barrier operator;

a movable barrier operator secure encrypted information communication link interface, the communication link interface employing a rolling code-based authentication protocol;

an intrusion detection system controller peripheral to the movable barrier operator and which controls devices peripheral to the movable barrier operator and is responsive, at least in part, to data from the movable barrier operator as the data is received via the movable barrier operator secure encrypted information communication link interface, the intrusion detection system controller and movable barrier operator configured to effect signals to each other via a local encrypted communication link using the movable barrier secure encrypted information link interface, the signals originating from the movable barrier operator or the intrusion detection system controller and including, at least in part, status information regarding a positional state of the devices peripheral to the movable barrier operator.

6. The egress control system of claim 5 wherein the intrusion detection system controller further comprises an actuator having a corresponding actuation time delay, wherein a first mode of operation of the actuation time delay is alterable, at least in part, in response to reception of data from a movable barrier operator via the movable barrier operator secure encrypted information communication link interface.

7. The egress control system of claim 5 wherein movable barrier operator secure encrypted information communication link interface is configured to employ a rolling-code based authentication protocol.

8. The egress control system of claim 5 wherein the data comprises information regarding at least one of:

reception by the movable barrier operator of a remotely transmitted command; or a predetermined state of a movable barrier as is controlled by the movable barrier operator.

9. An apparatus comprising:

a peripheral intrusion detection system controller;

a movable barrier operator secure communication link interface configured to communicate with a movable barrier operator over a local secure encrypted communication link;

wherein the peripheral intrusion detection system controller is configured to:

receive at least one encrypted information communication from the movable barrier operator using the movable barrier operator secure communication link interface and the local secure encrypted communication link, wherein the encrypted information comprises, at least in part, movable barrier operator status information; and cause a peripheral device action in response to receiving the at least one encrypted information communication.

10. The apparatus of claim 9 wherein the peripheral intrusion detection system controller is configured to cause an action regarding a system enablement state of the peripheral device.

11. The apparatus of claim 9 wherein the peripheral intrusion detection system controller is configured to cause an action regarding providing egress to a secured area.

12. The apparatus of claim 9 wherein the peripheral intrusion detection system controller is configured to receive the movable barrier operator status information comprising information regarding detection of attempted movement of the movable barrier.

13. The apparatus of claim 9 wherein the peripheral intrusion detection system controller is configured to receive the at least one encrypted information communication comprising, at least in part, a movable barrier movement command.

14. The apparatus of claim 9 wherein movable barrier operator secure encrypted information communication link interface is configured to employ a rolling-code based authentication protocol.

15. A method of controlling access to a secured area with a movable barrier operator and a movable barrier, a local secure wireless encrypted communication link between the movable barrier operator and an intrusion detection system peripheral to the movable barrier operator, the movable barrier operator responsive to signals from a remotely located user interface and which movable barrier operator controls movement of the barrier, the intrusion detection system peripheral to the movable barrier operator controlling devices peripheral to the movable barrier operator, the communication link employing a rolling code-based authentication protocol, the method comprising:

effecting at least one wireless signal representative of an encrypted information communication from the movable barrier operator to the intrusion detection system using the local secure wireless encrypted communication link, the at least one wireless signal originating from the movable barrier operator; and performing a control action in response to the intrusion detection system receiving the wireless signal representative of the at least one encrypted information communication from the movable barrier operator wherein providing an instruction to the movable barrier operator further comprises providing an instruction regarding subsequent movement of a movable barrier as is controlled, at least in part, by the movable barrier operator.

16. The method of claim 15 wherein effecting at least one wireless encrypted information communication further comprises:

providing data from the movable barrier operator to the intrusion detection system.

17. The method of claim 16 wherein effecting at least one wireless encrypted information communication further comprises:

effecting at least one intrusion detection system action as a function, at least in part, of the data.

18. The method of claim 16 wherein the encrypted information comprises, at least in part, movable barrier operator status information.

19. The method of claim 15 wherein effecting at least one wireless encrypted information communication comprises employing a rolling-code based authentication protocol.

20. An egress control system comprising:

a movable barrier operator;

a movable barrier operator secure encrypted information communication link interface, the communication link interface employing a rolling code-based authentication protocol;

an intrusion detection system controller peripheral to the movable barrier operator and which is configured to control devices peripheral to the movable barrier operator and is responsive, at least in part, to data from the movable barrier operator as the data is received via the movable barrier operator secure encrypted information communication link interface via a local encrypted communication link, the intrusion detection system controller and movable barrier operator configured to effect signals to each other via the movable barrier secure encrypted information link interface and the local secure encrypted communication link, the signals originating from the movable barrier operator or the intrusion detection system controller and including instructions regarding subsequent movement of a movable barrier as is controlled, at least in part, by the movable barrier operator.

21. The egress control system of claim 20 wherein the intrusion detection system controller further comprises an actuator having a corresponding actuation time delay, wherein a first mode of operation of the actuation time delay is alterable, at least in part, in response to reception of data from a movable barrier operator via the movable barrier operator secure encrypted information communication link interface.

22. The egress control system of claim 20 wherein movable barrier operator secure encrypted information communication link interface is configured to employ a rolling-code based authentication protocol.

23. The egress control system of claim 20 wherein the data comprises information regarding at least one of:

reception by the movable barrier operator of a remotely transmitted command; or a predetermined state of a movable barrier as is controlled by the movable barrier operator.

24. The method of claim 1 further comprising detecting reversal of movement of the movable barrier operator.

25. The method of claim 24 further comprising notifying the intrusion detection system of the reversal of movement of the movable barrier operator upon detection thereof.

26. The method of claim 1 further comprising disarming the intrusion detection system in response to an indication that the movable barrier operator has received an instruction to open.

27. The egress control system of claim 5 wherein the movable barrier operator is configured to detect reversal of movement of the movable barrier operator.

28. The egress control system of claim 27 wherein the movable barrier operator is configured to notify the intrusion detection system controller of the reversal of movement.

29. The egress control system of claim 5 wherein the intrusion detection system controller is configured to disarm in response to an indication that the movable barrier operator has received an instruction to open.

30. The apparatus of claim 9 wherein the movable barrier operator is configured to detect reversal of movement of the movable barrier operator.

31. The apparatus of claim 30 wherein the movable barrier operator is configured to notify the peripheral intrusion detection system controller of the reversal of movement.

32. The apparatus of claim 9 wherein the intrusion detection system controller is configured to disarm in response to an indication that the movable barrier operator has received an instruction to open.

33. The method of claim 15 further comprising detecting reversal of movement of the movable barrier operator.

34. The method of claim 33 further comprising notifying the intrusion detection system of the reversal of movement of the movable barrier operator upon detection thereof.

35. The method of claim 15 further comprising disarming the intrusion detection system in response to receipt of a notification that the movable barrier operator has received an instruction to open.

36. The egress control system of claim 20 wherein the movable barrier operator is configured to detect reversal of movement of the movable barrier operator.

37. The egress control system of claim 36 wherein the movable barrier operator is configured to notify the intrusion detection system controller that it has detected the reversal of movement via the movable barrier operator secure encrypted information communication link.

38. The egress control system of claim 20 wherein the intrusion detection system controller is configured to disarm in response to an indication that the movable barrier operator has received an instruction to open.

* * * * *

UNITED STATES PATENT AND TRADEMARK OFFICE

CERTIFICATE OF CORRECTION

PATENT NO. : 9,495,815 B2
APPLICATION NO. : 12/971374
DATED : November 15, 2016
INVENTOR(S) : James J. Fitzgibbon It is certified that error appears in the above-identified patent and that said Letters Patent is hereby corrected as shown below:

On the Title Page

Column 1, item (63) Related U.S. Application Data, Line 2: Delete "and" and insert -- which is --.

Signed and Sealed this
Ninth Day of May, 2017

*Michelle K. Lee*

Michelle K. Lee
*Director of the United States Patent and Trademark Office*